United States Patent [19]

Bell

[11] 4,249,768
[45] Feb. 10, 1981

[54] VEHICLES INCLUDING A MATERIALS SUPPORTING SURFACE ADAPTED FOR USE IN UNDERGROUND MINING OPERATIONS

[75] Inventor: Jack W. Bell, Bolton, England
[73] Assignee: Dobson Park Industries Limited, Colwick, England
[21] Appl. No.: 952,558
[22] Filed: Oct. 18, 1978
[30] Foreign Application Priority Data May 17, 1978 [GB] United Kingdom ............... 20299/78

[51] Int. Cl.³ .............................................. B60N 1/00
[52] U.S. Cl. ..................................... 296/63; 297/110; 297/124; 180/317
[58] Field of Search .................. 296/63; 297/110, 124, 297/126, 127, 112, 114; 5/118; 108/44; 180/77 MC

[56] References Cited
U.S. PATENT DOCUMENTS

| 918,706 | 4/1909 | Sanders | 297/110 |
| 1,415,209 | 5/1922 | Troke | 296/63 |
| 3,353,194 | 11/1967 | Matson | 5/118 |
| 3,367,712 | 2/1968 | Greene | 297/124 |

Primary Examiner—Robert R. Song
Attorney, Agent, or Firm—Brady, O'Boyle & Gates

[57] ABSTRACT

A vehicle for use in underground mining operations is disclosed which is adapted for ready conversion between personnel and materials transportation by the provision of a movable flat panel type platform or platform element movable between a first position, corresponding to a personnel transportation mode of operation, and a second position, corresponding to a materials transportation mode of operation. A bar type member extends from a seat structure transverse to its longitudinal direction which coincides with the longitudinal axis of the vehicle. The bar type member provides a horizontal support surface along with the top of the seat structure for supporting the platform in its materials transportation mode of operation. The seat structure comprises a pair of seats arranged in back-to-back relationship along the longitudinal axis of the vehicle and includes a space therebetween for the storage of said platform means in the personnel carriage mode of operation.

10 Claims, 4 Drawing Figures

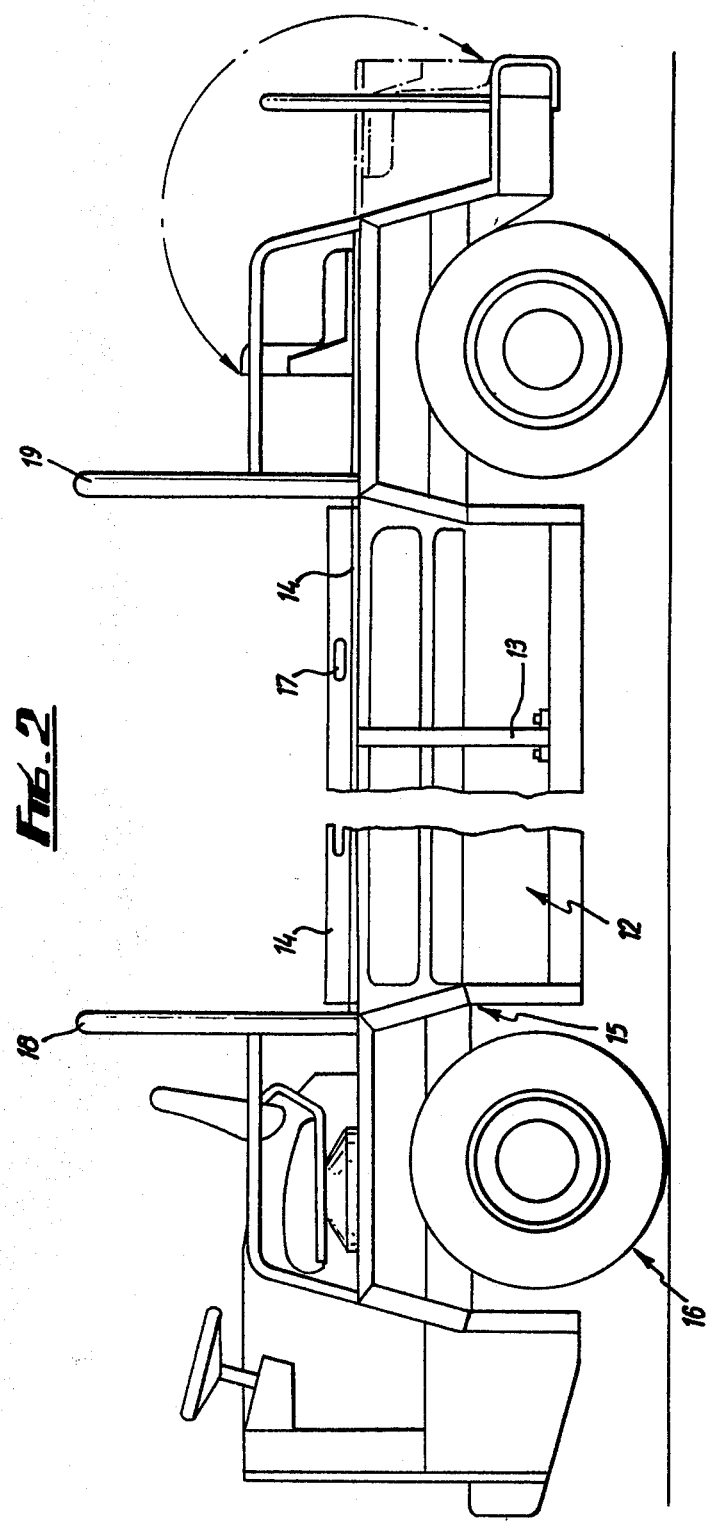

VEHICLES INCLUDING A MATERIALS SUPPORTING SURFACE ADAPTED FOR USE IN UNDERGROUND MINING OPERATIONS

The invention relates to a vehicle for use in underground mining operations, and has particular, though not exclusive reference to motor-driven vehicles for use in such context.

In underground mines, particularly in potash and salt mines, wherein there is no danger of explosion due to miners lamp or other natually occurring explosive gases, diesel-driven machinery and transportation vehicles have been used for some time for conveying mined materials, as too are such vehicles for transporting personnel in view of the sometimes substantial distances to and from the working locations. Larger potash mines, for example, have, and for some time have had, a comprehensive range of underground vehicles.

In addition, diesel driven vehicles are not able to be used in coal mines, particularly where Room and Pillar methods of mining are adopted, in that the problems previously met with in connection with diesel engines in such context and which militated against their use in coal mines have been largely overcome.

It is the object of the present invention to provide a vehicle, and preferably a self-propelled vehicle, capable of use as a material transporter or as a personnel carrier with minimal structural alteration as between the two modes of operation.

According to the invention there is provided a vehicle particularly, though not exclusively, for use in underground mining operations adapted for the selective transportation of materials and carriage of personnel, wherein the materials supporting surface is defined, at least in part, by a movable support platform or platform element adjustable between first and second positions, corresponding respectively to a materials transportation mode of operation, and to a personnel carriage mode of operation, the said platform or platfrom element overlying the seat or equivalent personnel support elements in the materials transportation mode of operation.

The platform or platform element may be separate from the seat or equivalent personnel support elements, or such platform or platform element may be secured to or defined by a part of the seat or equivalent personnel support elements, and in either event may be pivotal between the said first and second positions.

The invention will now be described further, by way of example only, with reference to the accompanying drawings, illustrating various embodiments thereof, and in which:

FIG. 2 is a side elevation of a vehicle having the arrangement as shown in FIG. 1 applied thereto;

Figure 1:
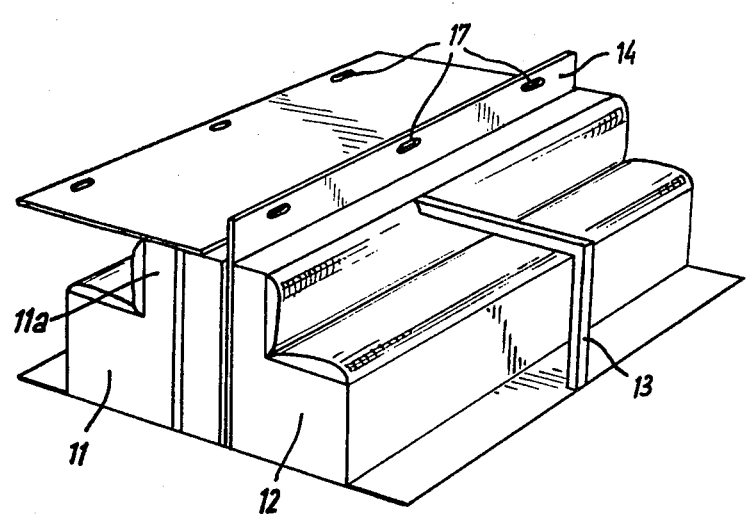
FIG. 1 is a diagrammatic perspective view of a first embodiment thereof.

Referring now to the drawing, and particularly to FIGS. 1 and 2 thereof, a vehicle of the kind to which the invention relates includes a seating arrangement comprising bench seats 11, 12 arranged in spaced, back-to-back disposition and having platform supporting means 13 provided in relation thereto to support a respective platform element 14, in the materials transportation mode of operation, in overlying, generally horizontal disposition relative to the seats 11, 12, the platform element 14 being stowed in generally vertical disposition between the opposed seat backs in the personnel carrier mode of operation.

As will be appreciated, and as is evident from a consideration of the left-hand part of FIG. 1, in the materials transportation mode of operation, the load platform 14 is supported on the top of the bench seat back 11a and on the top of the (or each in the event that there is more than one) platform supporting means 13. Stability of the platform element, in its load supporting role, may be enhanced, if necessary, by providing attachment means, not shown, for securing the platform element in position relative to the chassis 15 of the vehicle 16.

The bench seats 11, 12 as shown in FIG. 1 may extend in the longitudinal direction of the vehicle, as shown in FIG. 2, or transversely thereof, and the back-to-back disposition thereof may be varied, particularly in the latter case.

Suitable means (not shown) may be provided for mechanically shifting the platform elements 14 between the positions appropriate to the two modes of operation, such means including, if desired, lugs on the platform elements for cooperation with fixed guides on the structure and fluid operated piston and cylinder means for effecting such shift. Alternatively, the platform elements 14, may simply be man-handled between such positions, suitable hand-holes 17 being provided to assist such operation.

Figure 3:
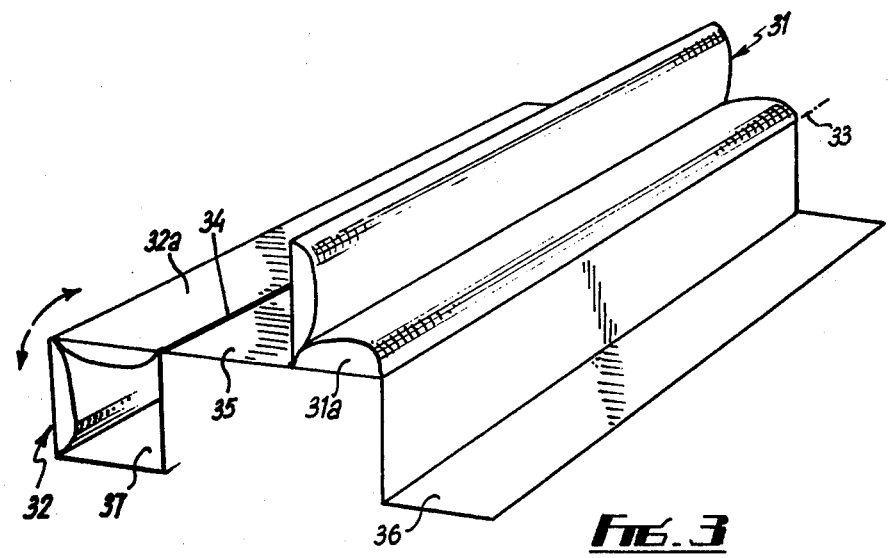
FIG. 3 is a diagrammatic perspective view of a second embodiment of the invention.

In a second embodiment, see now FIG. 3, two bench seats 31, 32 are provided in back-to-back relationship and extending in the longitudinal direction of the vehicle, the seats being tiltable about respective axes 33, 34 lying along the front edges of the seats such that the underside of each seat portion 31a, 32a in the folded condition of the bench seat, constitutes a lateral extension to a support surface 34 on which the bench seats rest when in the passenger mode of operation of the vehicle. The bench seat, on pivotting to its stowed position, is accommodated within the leg space 36, 37 of the seat.

The stowed, and inverted, position of the bench seat is shown in the left hand part of FIG. 3, whilst the erect, and passenger support, position of the seat is shown in the right hand part of the figure.

Figure 4:
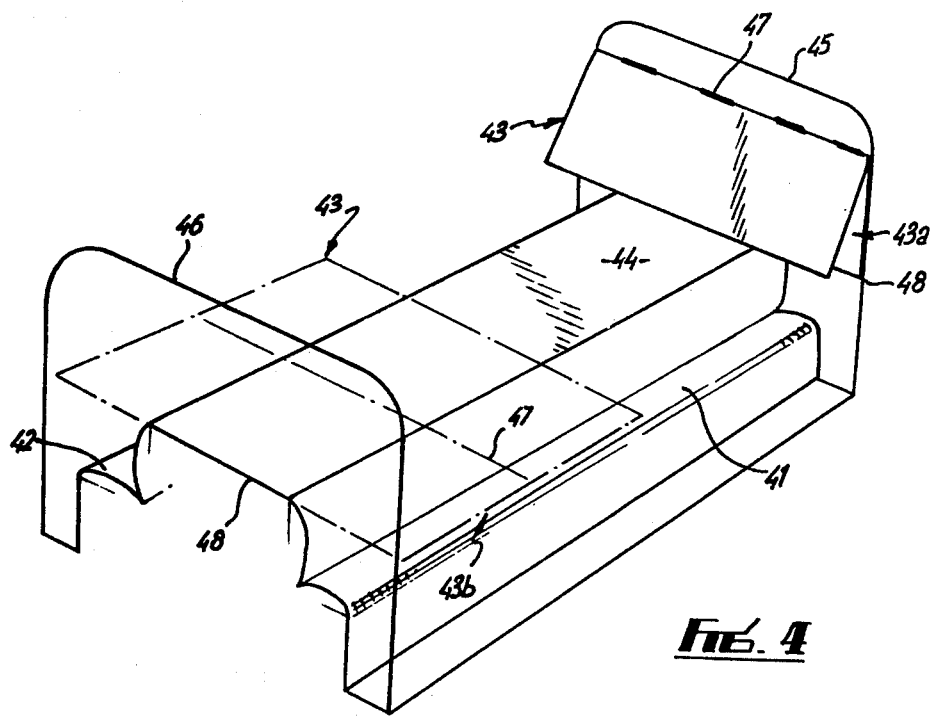
FIG. 4 is a view corresponding to FIGS. 1 and 3, and shows a further embodiment of the invention.

In a still further embodiment, see now FIG. 4, bench seats 41, 42 are provided at each longitudinal side of the vehicle, and a foldable platform structure 43 is movable between an effective load-bearing, position in which it rests on a generally horizontal support 44 lying between the tops of the backs of the bench seats and extends so as to overlie the bench seats, (as shown in the left-hand part of the arrangement shown in FIG. 4), and an ineffective position, (see the right hand side of FIG. 4), in which it is folded and stowed against the roll bars, 45, 46 provided at the opposite ends of the bench seats. As shown, the platform structure 43 is in two parts 43a, 43b, each part comprising plural elements hingedly connected together as at 47, and to a respective end of the structure, as at 48, and the two parts, when extended, overlying the seats, throughout the full length thereof.

The invention is not restricted to the exact features of the embodiments hereinbefore described, since alternatives will readily present themselves to one skilled in the art. Thus, for example, it is not intended that the invention be limited to vehicles wherein the bench seats (or any equivalent personnel support structures) are arranged longitudinally of the vehicle, since analogous arrangements to those disclosed disposed transversely of the vehicle may be preferred in some instances.

Furthermore, a part only of the materials transportation capacity of the vehicle may be adapted for operation selectively for materials transportation or the carriage of personnel.

It may be found desirable, in some instances, to provide a platform of such dimensions as to be common to a plurality of bench seats (or equivalent personnel support structures) in the materials transportation mode of operation, rather than to provide a respective panel element for each such seat.

I claim:

1. In a vehicle particularly though not exclusively adapted for use in underground mining operations for the selective transportation of materials and carriage of personnel and including a seat structure thereon, the improvement comprising:

a materials supporting surface defined, at least in part, by a movable support platform means adjustable between first and second positions corresponding respectively to a materials transportation mode of operation and to a personnel carriage mode of operation, said platform means overlying said seat structure in the materials transportation mode of operation;

platform support means comprising a bar type member extending from said seat structure in its normal position transversely of the longitudinal direction of said seat structure, said bar type member having a generally horizontal support surface upon which the platform means rests in the material transportation mode of operation and;

wherein said seat structure comprises a pair of seats arranged in back-to-back relationship along the longitudinal axis of the vehicle and including a space therebetween for the storage of said platform means in the personnel carriage mode of operation.

2. A vehicle as claimed in claim 1, wherein the horizontal support surface of said bar type member is substantially co-extensive with the top portion of said seat structure.

3. A vehicle as claimed in claim 1, wherein said bar type member is located intermediate the ends of said seat structure.

4. A vehicle as claimed in claim 1, wherein said seat structure includes a back portion and a seat portion and wherein said bar type member extends beyond said seat portion.

5. A vehicle as claimed in claim 1, wherein said bar type member comprises an angulated member having substantially vertical and horizontal portions and wherein said horizontal portion extends from said seat structure and said vertical portion extends downwardly to the floor portion of said vehicle.

6. A vehicle as defined in claim 1, wherein said bar type member extends from one of said pair of seats transversely of the longitudinal direction thereof, and additionally including another bar type member extending from the other seat of said pair of seats transversely of the longitudinal direction of said other seat, and wherein said support platform means comprises a pair of flat panel members each resting on respective members of said bar type members in the material transportation mode of operation.

7. A vehicle as claimed in claim 6, wherein both panels are adapted to be stowed in the space between said seats in the personnel carriage mode of operation.

8. A vehicle as claimed in claim 7, and additionally including a separator located in said space between said two seats and defining thereby separate stowage areas for said two panels.

9. A vehicle as claimed in claim 1, wherein said movable support platform means comprises a substantially flat panel having a length substantially equal to the longitudinal length of said seat structure and having means facilitating its being gripped by hand.

10. A vehicle as claimed in claim 9, wherein said means facilitating hand gripping comprises at least one hand-hole located adjacent an outer edge of said panel.

* * * * *